US007086964B2

(12) United States Patent
Chen et al.

(10) Patent No.: US 7,086,964 B2
(45) Date of Patent: Aug. 8, 2006

(54) WEIGHT MEMBER FOR A GOLF CLUB HEAD

(75) Inventors: Chan-Tung Chen, Kaohsiung (TW); Wen-Hung Tseng, Kaohsiung (TW)

(73) Assignee: Fu Sheng Industrial Co., Ltd., Taipei (TW)

(*) Notice: Subject to any disclaimer, the term of this patent is extended or adjusted under 35 U.S.C. 154(b) by 37 days.

(21) Appl. No.: 10/652,233

(22) Filed: Sep. 2, 2003

(65) Prior Publication Data

US 2005/0049075 A1 Mar. 3, 2005

(51) Int. Cl.
*A63B 53/04* (2006.01)
*A63B 53/06* (2006.01)

(52) U.S. Cl. ...................................... 473/350; 473/324

(58) Field of Classification Search ......... 473/334–338
See application file for complete search history.

(56) References Cited

U.S. PATENT DOCUMENTS 1,133,129 A * 3/1915 Govan ........................ 473/337
4,330,128 A * 5/1982 Morelli ....................... 473/307
5,385,348 A * 1/1995 Wargo ........................ 473/338
5,655,976 A * 8/1997 Rife ........................... 473/340
6,458,044 B1 * 10/2002 Vincent et al. ............. 473/334
6,592,468 B1 * 7/2003 Vincent et al. ............. 473/334

FOREIGN PATENT DOCUMENTS

JP 10179822 A * 7/1998
JP 2002011124 A * 1/2002

* cited by examiner

*Primary Examiner*—Eugene Kim
*Assistant Examiner*—Alvin A. Hunter, Jr.
(74) *Attorney, Agent, or Firm*—Birch, Stewart, Kolasch & Birch, LLP

(57) ABSTRACT

A golf club head includes a golf club head body and a weight member mounted in a recession of the golf club head body. The weight member includes at least one compartment for receiving a filling material. The weight member is mounted in the recession of the golf club head body before a brazing process for bonding the weight member with the golf club head body. During the brazing process, the filling material is melted and fills a gap between the weight member and walls delimiting the recession of the golf club head body to thereby increasing bonding strength between the weight member and the walls delimiting the recession of the golf club head body.

13 Claims, 8 Drawing Sheets

10
11
21
201
22
22
20
203
202

WEIGHT MEMBER FOR A GOLF CLUB HEAD

BACKGROUND OF THE INVENTION

1. Field of the Invention

The present invention relates to a weight member for a golf club head. In particular, the present invention relates to a weight member having a structure allowing it to be fixed in a recession of a golf club head body by brazing.

2. Description of Related Art

FIG. 1 of the drawings illustrates a conventional golf club head including a golf club head body 10 and a weight member 20. The golf club head body 10 is made of a low-density material such as a titanium alloy or Fe—Mn—Al alloy, and the weight member 20 is made of a high-density material such as a W—Fe—Ni alloy. The weight member 20 is fixed in a recession 11 of the golf club head body 10 by an appropriate means to form a golf club head product with a lower center of gravity, to increase the overall volume of the golf club head, to reduce the thickness of the golf club head, and to improve the capacity of deformation. Nevertheless, welding cannot be used to bond the golf club head body 10 and the weight member 20 made of different materials. Therefore, brazing is usually used in the golf club head industry to bond the golf club head body 10 and the weight member 20.

FIG. 2 is an exploded sectional view of the golf club head in FIG. 1. FIG. 3 is a sectional view of the conventional golf club head during brazing. FIG. 4 is a sectional view of the conventional golf club head after brazing. During the brazing process, a filling material 30 with a low melting point is placed into the recession 11 of the golf club head 10 and then heated. Next, the weight member 20 is inserted into the recession 11 of the golf club head body 10. After cooling, the filling material 30 securely bonds the golf club head body 10 and the weight member 20 together. This brazing process is widely used, as the operation is simple. However, as illustrated in FIGS. 3 and 4, in actual operation, since the weight member 20 is inserted into the recession 11 of the golf club head body 10 after placing the filling material 30 into the recession 11, it is difficult for an operator to control the amount of the filling material 30, the engaging relationship between the recession 11 and the weight member 20, and the force required for inserting the weight member 20 into the recession 11. In particular, four sides of the weight member 20 substantially abut against a peripheral wall delimiting the recession 11 when the weight member 20 is inserted into the recession 11, yet there is no space for compression during insertion of the weight member 20. As a result, the sides of the weight member 20 cannot be in Further, if brazing paste is used as the filling material 30, organic materials are generated and volatilize when the brazing paste is heated, adversely affecting the brazing result. As a result, many problems occur, such as outflow of the filling material 30, unreliable filling of a gap between the weight member 20 and the walls delimiting the recession 11, generation of voids, and waste of filling material. The bonding strength for the weight member 20 is adversely affected, and the operation of the brazing process is difficult.

OBJECTS OF THE INVENTION

An object of the present invention is to provide a weight member including at least one compartment for receiving a sufficient amount of a filling material that can be melted and thus fill a gap between the weight member and walls delimiting a recession of a golf club head body, thereby improving reliability of brazing and increasing the qualified product ratio.

Another object of the present invention is to provide a weight member including at least one compartment for receiving a filling material, allowing the weight member to be positioned in a recession of a golf club head body during brazing. The brazing process is simplified and the operational difficulty of brazing is reduced.

A further object of the present invention is to provide a weight member including at least one compartment for receiving a filling material and a plurality of channels in at least one of four lateral sides of the weight member. The channels guide and receive the filling material while brazing the weight member into a recession of a golf club head body, thereby increasing the brazing bonding area and improving the bonding strength.

Still another object of the present invention is to provide a golf club head including a golf club head body and a weight member. The weight member includes a plurality of positioning pegs and a bottom wall of the recession of the golf club head includes a plurality of positioning holes for receiving the positioning pegs. The positioning holes and the positioning pegs are so sized that a gap is defined between the weight member and the bottom wall delimiting the recession during the brazing process, thereby improving the brazing result.

SUMMARY OF THE INVENTION

To achieve the aforementioned objects, the present invention provides a weight member includes at least one compartment for receiving a filling material. The weight member is inserted into a recession of a golf club head body before brazing. The filling material is melted and fills a gap between the weight member and the walls delimiting the recession during the brazing process, thereby improving the bonding strength between the weight member and the walls delimiting the recession of the golf club head body.

The present invention also provides a golf club head including a golf club head body and a weight member. The weight member includes at least one compartment for receiving a filling material. The weight member is inserted into a recession of the golf club head body before brazing. The filling material is melted and fills a gap between the weight member and the walls delimiting the recession during the brazing process, thereby improving the bonding strength between the weight member and the walls delimiting the recession of the golf club head body.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects, advantages and novel features of this invention will become more apparent from the following detailed description when taken in conjunction with the accompanying drawings, which are given by way of illustration only, and thus are not limitative of the present invention, and wherein.

DETAILED DESCRIPTION OF THE PREFERRED EMBODIMENTS

Figure 1:
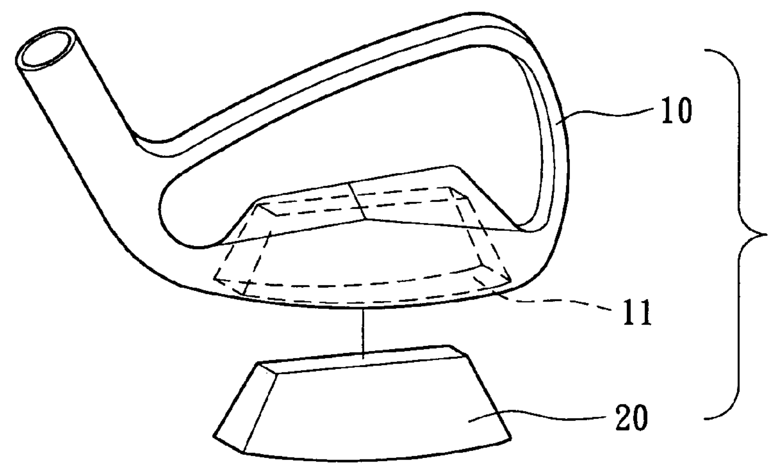
FIG. 1 is an exploded perspective view of a conventional golf club.
Figure 2:
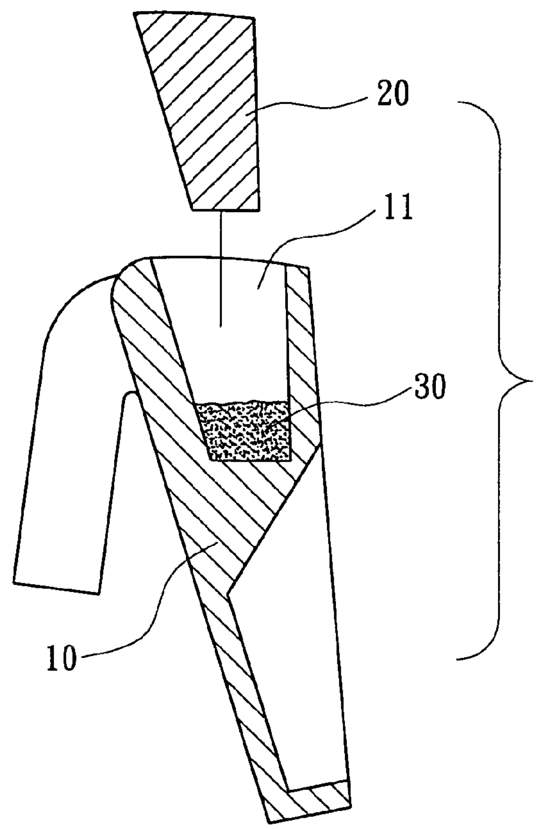
FIG. 2 is an exploded sectional view of the golf club head in FIG. 1.
Figure 4:
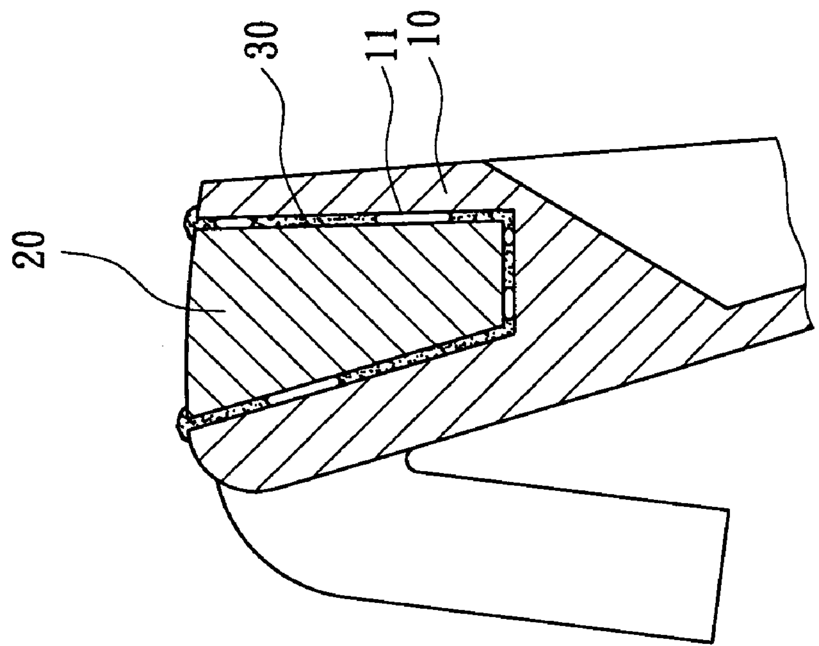
FIG. 4 is a sectional view of the conventional golf club head after brazing.
Figure 3:
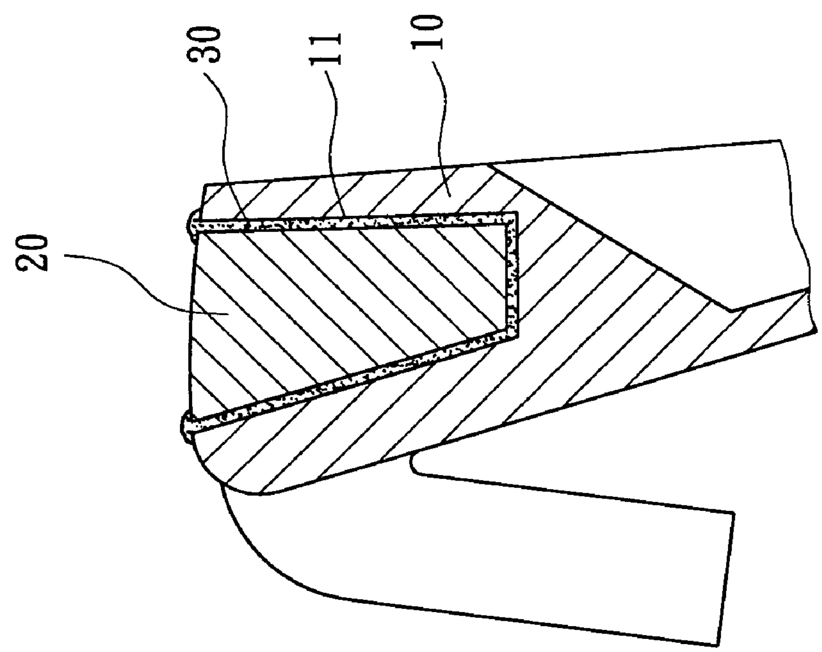
FIG. 3 is a sectional view of the conventional golf club head during brazing.

Preferred embodiments of the present invention are now to be described hereinafter in detail, in which the same reference numerals are used in the preferred embodiments for the same parts as those in the prior art to avoid redundant description.

Figure 5:
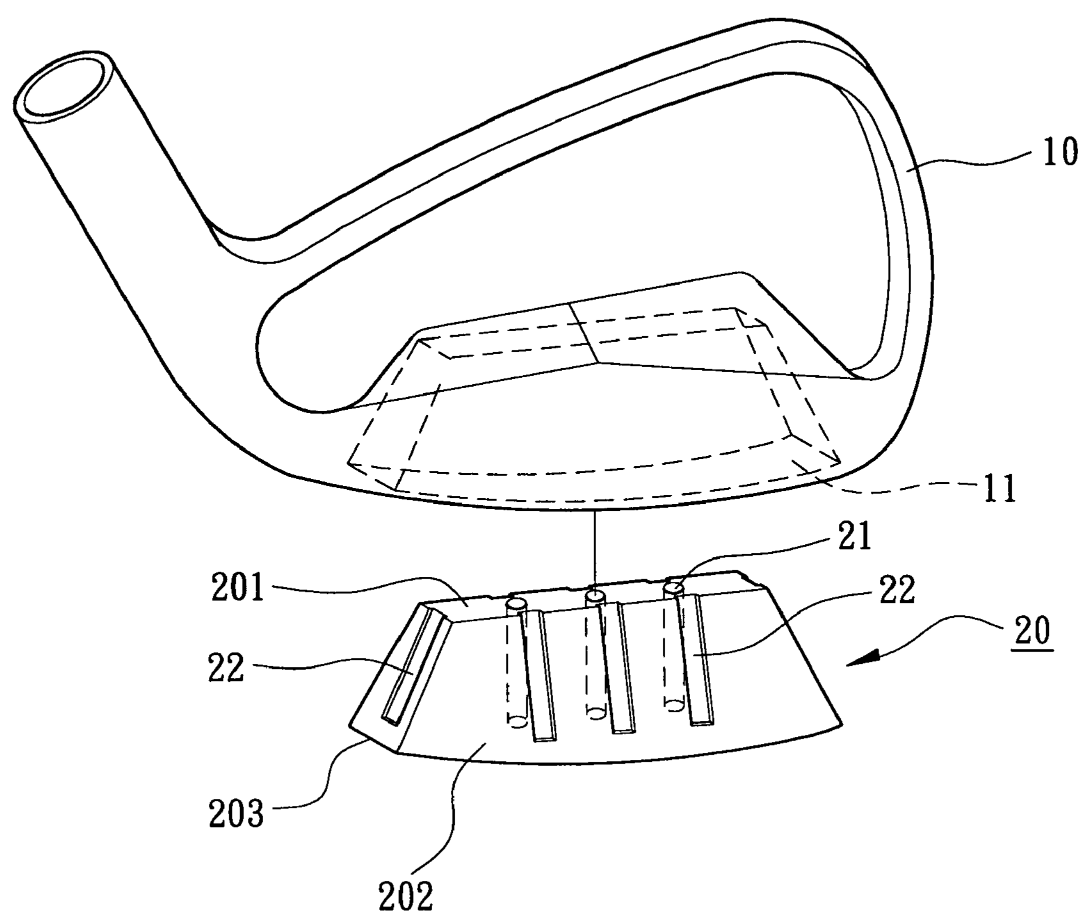
FIG. 5 is an exploded perspective view of a golf club head in accordance with the present invention.
Figure 6:
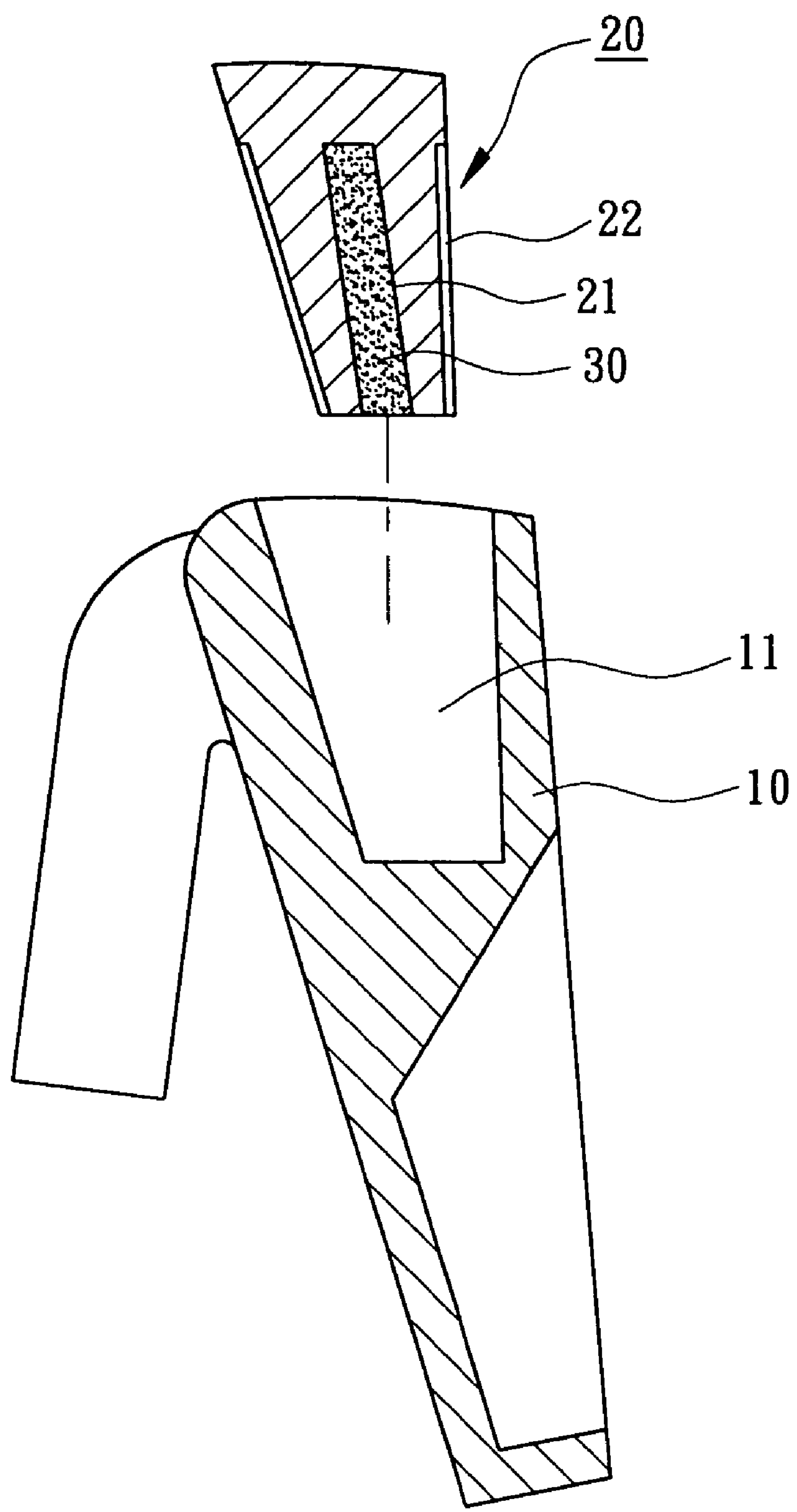
FIG. 6 is an exploded sectional view of the golf club head in accordance with the present invention.
Figure 8:
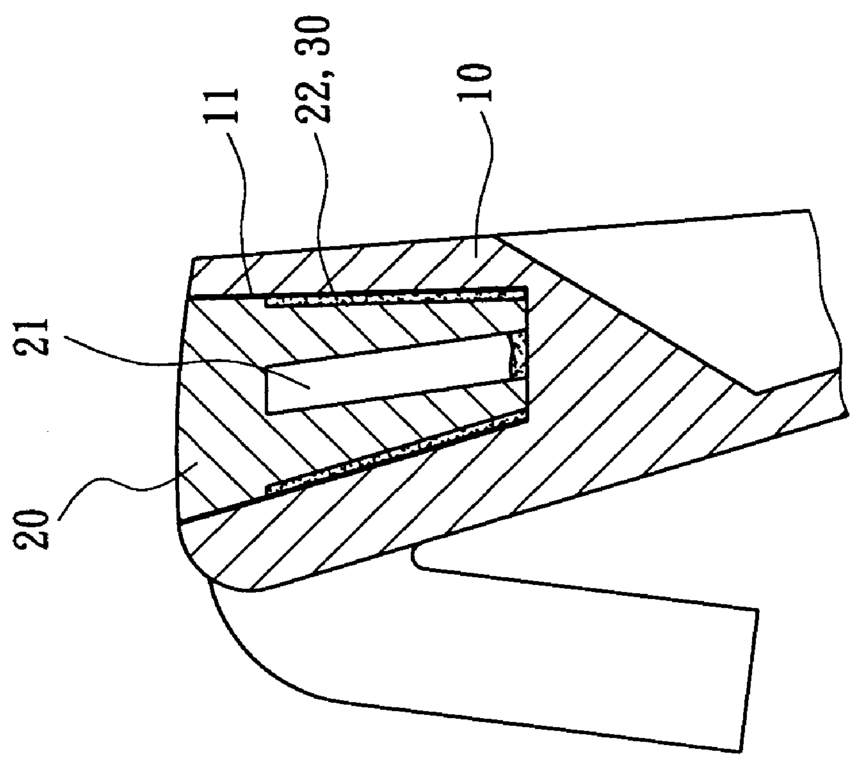
FIG. 8 is a sectional view of the golf club head in accordance with the present invention after brazing.
Figure 7:
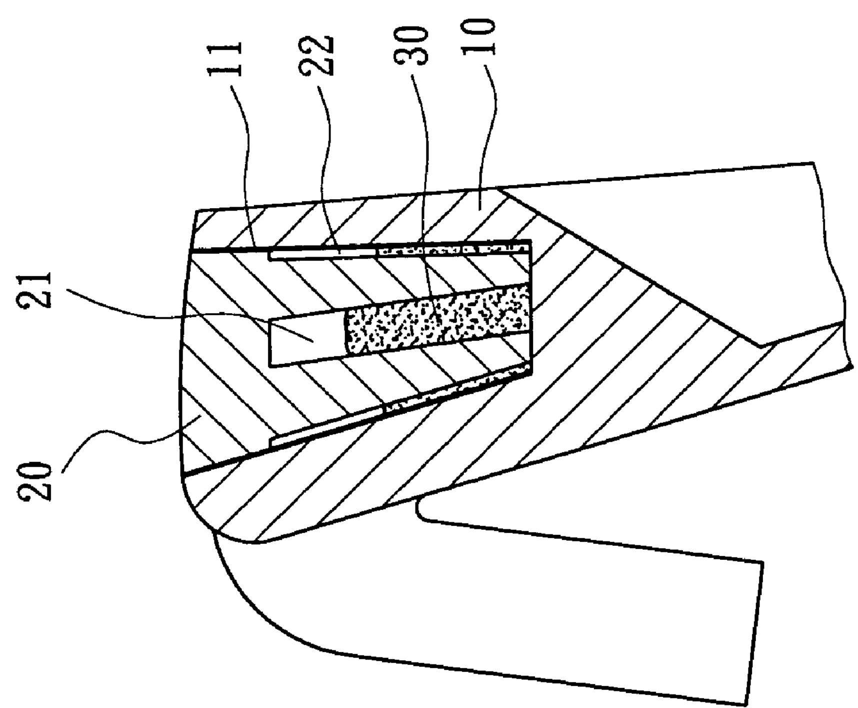
FIG. 7 is a sectional view of the golf club head in accordance with the present invention during brazing.

FIG. 5 is an exploded perspective view of a golf club head in accordance with the present invention. FIG. 6 is an exploded sectional view of the golf club head in accordance with the present invention. FIG. 7 is a sectional view of the golf club head in accordance with the present invention during brazing. FIG. 8 is a sectional view of the golf club head in accordance with the present invention after brazing.

As illustrated in FIG. 5, the golf club head includes a golf club head body 10 and a weight member 20. The golf club head body 10 is made of a low-density metal such as a titanium alloy, Fe—Mn—Al alloy, stainless steel, or soft iron. The golf club head body 10 includes a recession 11 at an appropriate position, and the weight member 20 is inserted into the recession 11. The recession is delimited by walls including a bottom wall (not labeled) and a plurality of side walls (not labeled). The weight member 20 is made of a high-density metal such as a W—Fe—Ni alloy. The weight member 20 includes a top engaging face 201, a plurality of engaging sides 202, and a bottom face 203 opposite to the top engaging face 201. At least one compartment 21 (three in this embodiment) is defined in the weight member 20 and has at least one opening defined in one of the engaging sides 202, the bottom face 203, and the top engaging face 201.

The respective compartment 21 is preferably defined in the top engaging face 201 of the weight member 20. Preferably, the respective compartment 21 is a cylindrical or conic blind hole. At least one channel 22 is defined in at least one of the engaging sides 202 of the weight member 20. Generally, the respective channel 22 does not extend to the bottom side 203 of the weight member 20. Preferably, the respective channel 22 has a depth between 0.03 mm and 0.2 mm.

A filling material 30 of a sufficient amount is filled into the compartments 21 of the weight member 20, and the weight member 20 is then inserted into the recession 11 of the golf club head body 10 before the brazing process, as illustrated in FIG. 6. The filling material 30 has a melting point lower than that of the golf club head body 10 and that of the weight member 20. During the brazing process, as illustrated in FIG. 7, the golf club head body 10 is heated and thus melts the filling material 30 in the compartments 21 of the weight member 20. The molten filling material 30 enters and thus fills a gap between the weight member 20 and walls delimiting the recession 11 under capillary action. At the same time, the channels 22 guide and receive the filling material 30, thereby expediting filling of the filling material 30 into the gap between the respective engaging side 202 of the weight member 20 and the walls delimiting the recession 11. As illustrated in FIG. 8, after brazing and after cooling, the weight member 20 and the golf club head body 10 are firmly bonded by the filling material 30 of a sufficient amount between the respective engaging side 202 of the weight member 20 and the walls delimiting the recession 11. The compartments 21 and the channels 22 increase the bonding area and thus improve the bonding strength and bonding reliability between the weight member 20 and the golf club head body 10 and improve the qualified product ratio. The term “gap” used herein includes the channels 22 of the weight member 20 and any space that may exist between the engaging sides 202 of the weight member 20 and the side walls delimiting the recession 11 of the golf club head body 10 and between the top engaging face 201 of the weight member 20 and the bottom wall delimiting the recession 11 of the golf club head body 10 and a bottom wall delimiting the recession 11 of the golf club head body 10.

Further, when the weight member 20 is engaged in the recession 11 of the golf club head body 10, since the weight member 20 includes at least one channel 22, the weight member 20 provides a space or tolerance for compression while inserting the weight member 20 into the recession 11. Thus, no gap exists between the weight member 20 and the walls delimiting the recession 11 through the deformation of the weight member 20.

The filling material 30 is preferably solid, and the overall volume of the compartments 21 is not less than the volume of the gap between the weight member 20 and the walls delimiting the recession 11 so as to receive the filling material 30. For example, in a case that a single channel 22 is adopted, if the volume of the channel 22 is about 30 $mm^3$–200 $mm^3$, the overall volume of the compartments 21 will be at least 30 $mm^3$–200 $mm^3$. In this case, a single cylindrical compartment 21 having a diameter of 3 mm and a depth of 8 mm is sufficient.

In an alternative embodiment, the filling material 30 is a pasty filling material containing a bonding agent. Since 50% of a volume of the pasty filling material oxidizes and volatilizes when it is heated and thus melted, the amount of the pasty filling material must be twice of that for the solid filling material. The overall volume of the compartment(s) 21 will be at least 60 $mm^3$–400 $mm^3$.

Since the gap between the golf club head body 10 and the weight member 20 varies in response to a change in the product and/or the manufacturing process, the remaining filling material 30 remains in the compartments 21 after filling the gap under capillary action. Thus, the product weight can be precisely controlled while avoiding erroneous manufacture and avoiding difficult control of the amount of the filling material.

Further, since the brazing process is performed after the weight member 20 is inserted into the recession 11 of the golf club head body 10, the operational convenience is improved and the procedure is simplified in comparison with the conventional brazing process in which the filling material is added into the recession 11 before inserting the weight member 20 into the golf club head body 10.

Figure 9:
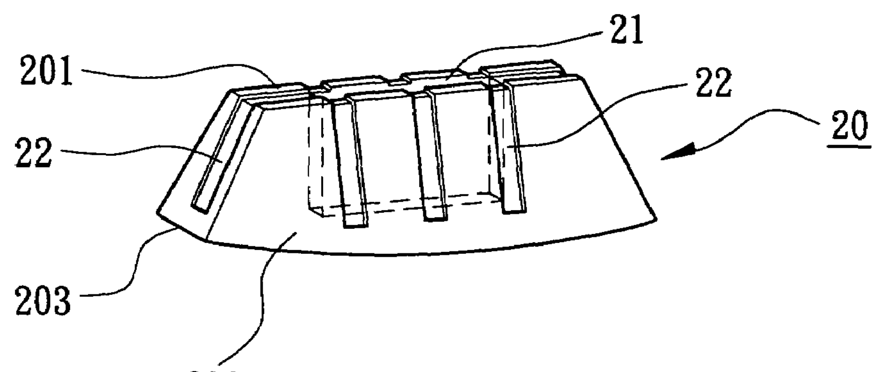
FIG. 9 is a perspective view illustrating a modified embodiment of the weight member of the golf club head in accordance with the present invention.

FIG. 9 is a perspective view illustrating a modified embodiment of the weight member of the golf club head in accordance with the present invention. In this embodiment, the weight member 20 includes a compartment 21 that is a blind hole having a rectangular section. Further, the respective channel 22 extends to the top engaging face 201 of the weight member 20 and communicates with the opening of the compartment 21. Thus, the compartment 21 may receive more filling material 30, and the molten filling material 30 may flow easily to the engaging sides 202 via the channels 22.

Figure 10:
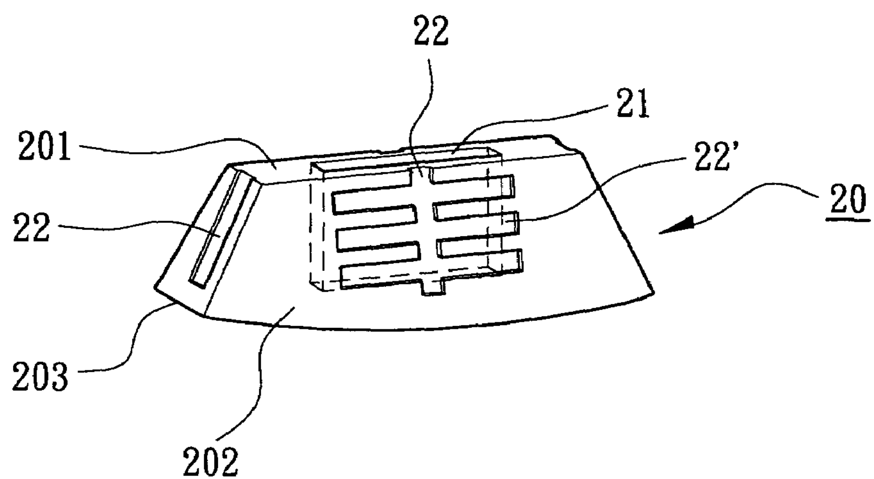
FIG. 10 is a perspective view illustrating another modified embodiment of the weight member of the golf club head in accordance with the present invention.

FIG. 10 is a perspective view illustrating another modified embodiment of the weight member of the golf club head in accordance with the present invention. In this embodiment, the weight member 20 includes a channel 22 in each engaging sides 202 and at least one extension channel 22' extending in a direction transverse to the channel 22. Thus, the channels 22 and the extension channels 22' receive more filling material 30. The bonding area between the weight member 20 and the walls delimiting the recession 11 is increased accordingly.

Figure 11:
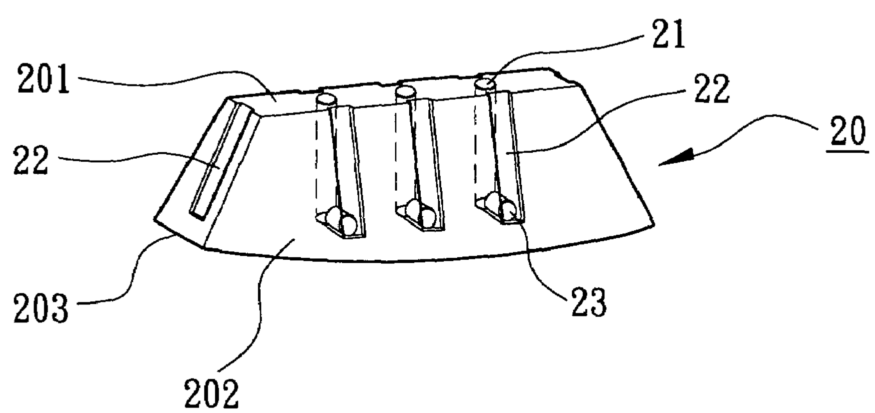
FIG. 11 is a perspective view illustrating a further modified embodiment of the weight member of the golf club head in accordance with the present invention.

FIG. 11 is a perspective view illustrating a further modified embodiment of the weight member of the golf club head in accordance with the present invention. In this embodiment, at least one connecting hole 23 is defined in the weight member 20 for communicating the respective compartment 21 with an associated one of the respective channel 22. In this embodiment, three connecting holes 23 are defined in the weight member 20, with two ends of each connecting hole 23 being respectively communicated with two channels 23 respectively on two lateral engaging sides 202 of the weight member 20. Thus, even if the engaging sides 202 of the weight member 20 are in tight contact with the side walls delimiting the recession 11 of the golf club head body 10, the connecting hole 23 provides a passage for ventilation to assure smooth flowing of the molten filling material 30 into the respective channel 22, thereby assuring the brazing result.

Figure 12:
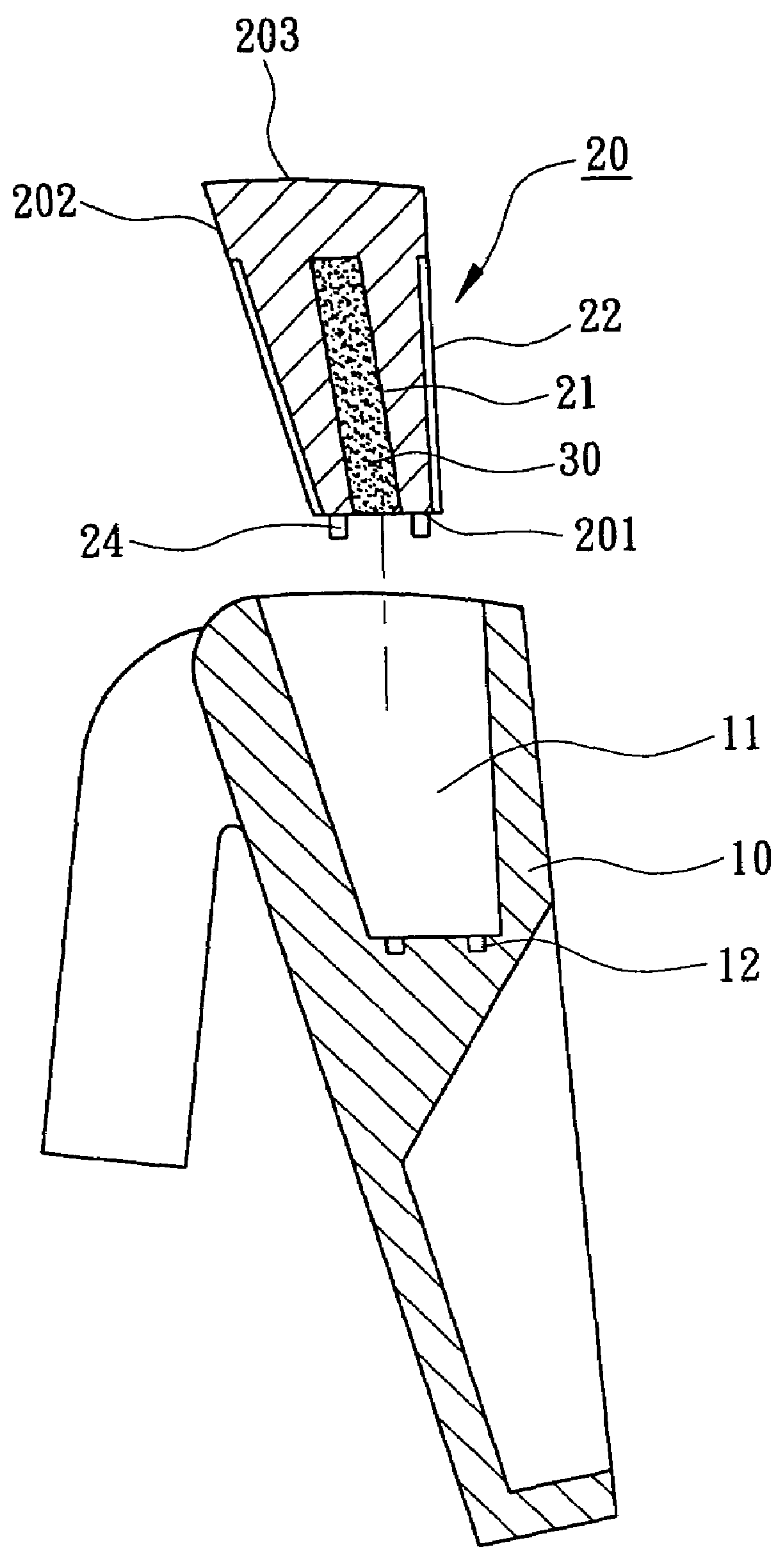
FIG. 12 is an exploded sectional view illustrating a modified embodiment of the golf club head in accordance with the present invention.
Figure 13:
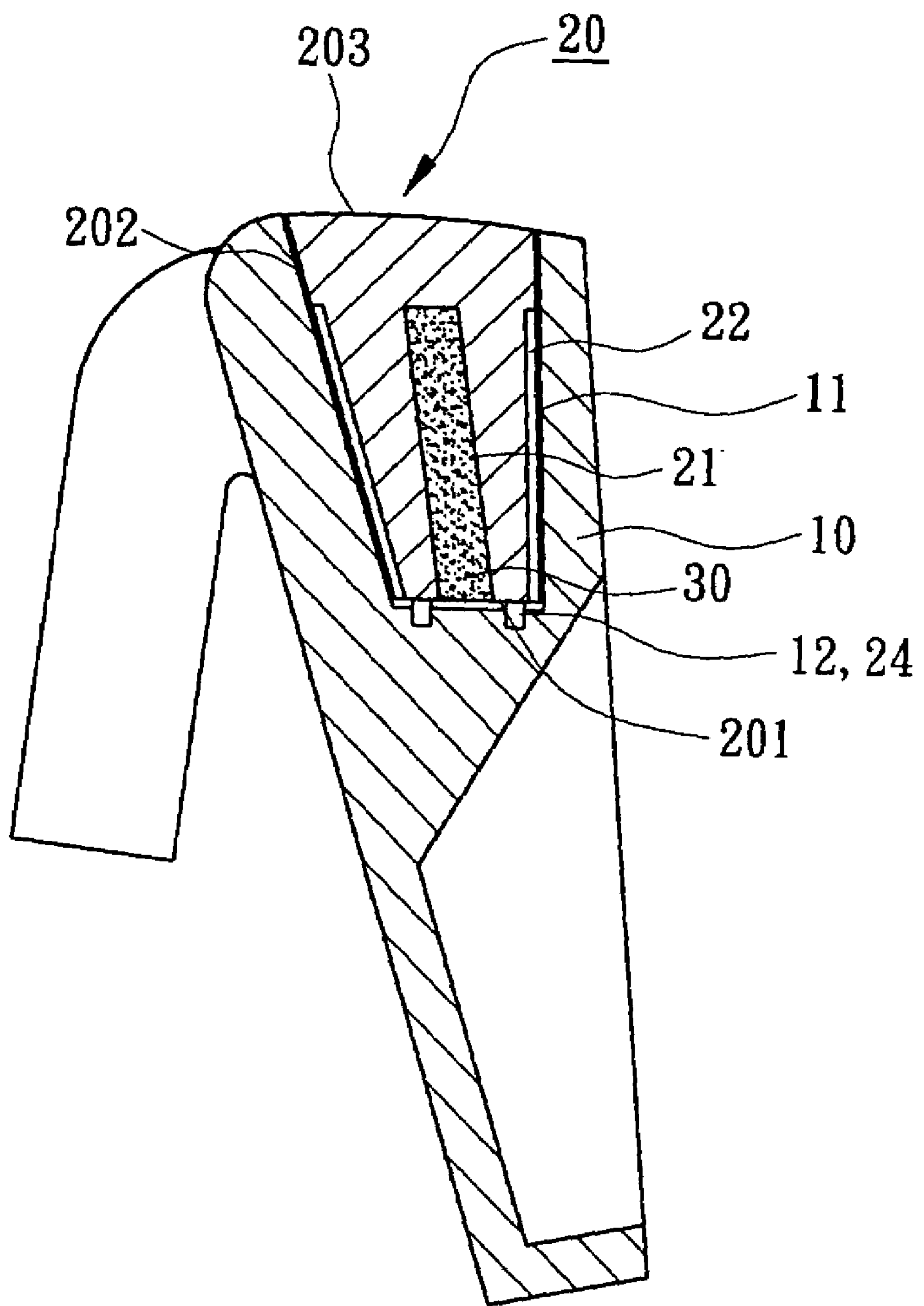
FIG. 13 is a sectional view illustrating the modified embodiment of the golf club head in FIG. 12.

FIG. 12 is an exploded sectional view illustrating a modified embodiment of the golf club head in accordance with the present invention. FIG. 13 is a sectional view illustrating the modified embodiment of the golf club head in FIG. 12. In this embodiment, the bottom wall delimiting the recession 11 of the golf club head body 10 includes a plurality of positioning holes 12, and the top engaging face 201 of the weight member 20 includes a plurality of positioning pegs 24 each having a length greater than that of the respective positioning hole 12. Thus, when the weight member 20 is inserted into the recession 11, with the respective positioning peg 24 being engaged in the respective positioning hole 12, a space or gap exists between the bottom wall delimiting the recession 11 of the golf club head body 10 and the top engaging face 201 of the weight member 20, as shown in FIG. 13. This assures molten filling material to flow into the gap between the side walls delimiting the recession 11 of the golf club head body 10 and the engaging sides 202 of the weight member 20. As a result, the weight member 20 is positioned and thus improves the brazing result.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A golf club head comprising:

a golf club head body including a recession; and a weight member mounted in the recession of the golf club head body, the weight member comprising:

at least one compartment for receiving a braze material, the weight member being inserted into the recession of the golf club head body in preparing for braze-welding the weight member to the recession of the golf club head body, and an outer surface closely engaged with the recession of the golf club head body that forms a gap between the outer surface of the weight member and a plurality of walls of the recession of the golf club head body so as to permit flowing of the melting braze material, and then the gap is filled with the melting braze material in supplying from the compartment during a brazing process to thereby increase bonding strength between the outer surface of the weight member and the walls of the recession of the golf club head body.

2. The golf club head as claimed in claim 1, wherein the recession of the golf club head body being delimited by a bottom wall and a plurality of side walls, the bottom wall including a plurality of positioning holes, the weight member including a plurality of positioning pegs respectively received in the positioning holes in a manner that the bottom wall delimiting the recession of the golf club head body is spaced from the weight member.

3. The golf club head as claimed in claim 1, wherein the braze material is solid.

4. The golf club head as claimed in claim 3, wherein an overall volume of said at least one compartment of the weight member is not less than that of the gap between the weight member and the walls delimiting the recession of the golf club head body.

5. The golf club head as claimed in claim 1, wherein the braze material is a pasty braze material containing a bonding agent.

6. The golf club head as claimed in claim 5, wherein an overall volume of said at least one compartment of the weight member is two times of that of the gap between the weight member and the walls delimiting the recession of the golf club head body.

7. The golf club head as claimed in claim 1, wherein said at least one compartment includes at least one opening.

8. The golf club head as claimed in claim 1, wherein the weight member includes a plurality of engaging sides, the walls delimiting the recession of the golf club head body including a plurality of side walls for bonding with the engaging sides of the weight member, each said engaging side of the weight member including at least one channel for receiving and guiding melting braze material during the brazing process.

9. The golf club head as claimed in claim 8, wherein said at least one channel has a depth between 0.03 mm and 0.2 mm.

10. The golf club head as claimed in claim 9, wherein the weight member includes a top engaging face in which said at least one compartment is defined, said at least one channel extending to the top engaging face of the weight member and communicating with said at least one compartment.

11. The golf club head as claimed in claim 8, further including at least one extension channel defined in at least one of the engaging sides of the weight member, said at least one extension channel communicating with said at least one channel of said at least one of the engaging sides of the weight member and extending in a direction transverse to said at least one channel of said at least one of the engaging sides of the weight member.

12. The golf club head as claimed in claim 8, wherein the weight member further includes at least one connecting hole defined therein for communicating said at least one compartment and said at least one channel.

13. The golf club head as claimed in claim 8, wherein said at least one channel is defined on each of two opposed side walls delimiting the recession of the golf club head body, the weight member further including at least one connecting hole defined therein, said at least one connecting hole having a first end communicated with said at least one channel on one of the opposed side walls delimiting the recession of the golf club head body and a second end communicated with said at least one channel on another of the opposed side walls delimiting the recession of the golf club head body.

* * * * *